United States Patent
Sekihara et al.

(10) Patent No.: US 6,874,324 B2
(45) Date of Patent: Apr. 5, 2005

(54) GAS TURBINE AND GAS TURBINE POWER GENERATOR

(75) Inventors: Masaru Sekihara, Hitachi (JP); Saburo Usami, Hitachi (JP); Yasushi Hayasaka, Mito (JP); Satoschi Dodo, Mito (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 10/425,706

(22) Filed: Apr. 30, 2003

(65) Prior Publication Data

US 2003/0217548 A1 Nov. 27, 2003

(30) Foreign Application Priority Data

May 22, 2002 (JP) ........................... 2002-147072

(51) Int. Cl.[7] ................................... F02C 7/32
(52) U.S. Cl. .............................. 60/798; 60/801
(58) Field of Search ................... 60/798, 805, 726, 60/801; 29/889.2, 889.21; 416/179, 183

(56) References Cited

U.S. PATENT DOCUMENTS

| | | | | |
|---|---|---|---|---|
| 2,821,067 A | * | 1/1958 | Hill | 60/805 |
| 3,077,075 A | * | 2/1963 | Turanciol | 60/39.35 |
| 3,916,495 A | | 11/1975 | Klassen et al. | |
| 3,958,905 A | * | 5/1976 | Wood | 416/183 |
| 4,005,572 A | * | 2/1977 | Giffhorn | 60/39.281 |
| 4,040,249 A | * | 8/1977 | Kahle et al. | 60/39.512 |
| 4,183,719 A | * | 1/1980 | Bozung | 416/183 |
| 4,424,003 A | | 1/1984 | Brobeck | |
| 4,639,194 A | | 1/1987 | Bell, III et al. | |
| 4,705,463 A | * | 11/1987 | Joco | 417/407 |
| 4,815,184 A | * | 3/1989 | Johnston et al. | 29/889.2 |
| 4,854,025 A | * | 8/1989 | Oda et al. | 29/889.2 |
| 5,210,945 A | * | 5/1993 | Suzuki | 29/889.21 |
| 5,741,123 A | * | 4/1998 | Pauly | 417/407 |
| 6,324,831 B1 | * | 12/2001 | Izadi et al. | 60/796 |

FOREIGN PATENT DOCUMENTS

| | | |
|---|---|---|
| JP | 5442520 | 4/1979 |
| JP | 5730301 | 2/1982 |
| JP | 591337 | 1/1984 |
| JP | 59024242 | 6/1984 |
| JP | 60050204 | 3/1985 |
| JP | 427363 | 5/1992 |
| JP | 08004501 | 1/1996 |
| JP | 2001012256 | 1/2001 |

* cited by examiner

*Primary Examiner*—Ehud Gartenberg
(74) *Attorney, Agent, or Firm*—Crowell & Moring LLP (57) ABSTRACT

In a gas turbine power generator, a compressor rotor and a junction boss are assembled by fitting a convex faucet joint provided on the compressor rotor and a concave faucet joint provided on the junction boss, in a freely releasable manner, and the compressor rotor and a rotor shaft are assembled by fitting the convex faucet joint provided on the compressor rotor and a concave faucet joint provided on the rotor shaft, in a freely releasable manner, and those compressor rotor, the rotor shaft and a generator core are combined in series and fastened by using a tie bolt and a nut, which is connected to the junction boss of the turbine rotor.

7 Claims, 8 Drawing Sheets

GAS TURBINE AND GAS TURBINE POWER GENERATOR

BACKGROUND OF THE INVENTION

The present invention relates to the structure of a turbine, as well as, a gas turbine power generator applying such the structure therein.

Conventionally, within a category of the gas turbine power generator, a power generator, being so-called by "micro gas turbine power generator" is already known, for example, in Japanese Patent Laying-Open 2001-12256 (2001). On the other hand, it is described that the press-fitting, shrinkage fitting and/or drawing are/is used to connect both, when attaching a shaft to a rotor of a compressor or a turbine, such as, in Japanese Patent Publication No. Hei 4-15361 (1992), Japanese Patent Publication No. Hei 4-27363 (1992), Japanese Patent Publication No. Sho 54-42520 (1979), and Japanese Utility-Model laying-Open No. Sho 57-30301 (1982), for example.

It is also described that both are attached with, by meshing concave-convex of teeth portions of both, when the shaft is attached onto the rotor of a compressor or a turbine, such as, Japanese Patent Laying-open No. Hei 8-4501 (1996), Japanese Patent Publication No. Sho 59-24242 (1984), and Japanese Patent Publication No. Sho 59-1337 (1984), for example.

The fastening structure of the gas turbine in the conventional micro gas turbine power generator, in general, is such that, by taking fablicability thereof into the consideration, rotary parts, such as, a turbine rotor, a rotor shaft, a compressor rotor, a generator core, etc., are assembled by fitting with each other through faucet joint having interferences therebetween, and thereby being fastened by means of a tie bolt being parallel with the rotation axis thereof.

However, since maintenance must be conducted thereon periodically, the micro gas turbine power plant having such the structure needs a facility for conducting the shrinkage fitting through baking or cooling, as well as, a facility for disassembling when it is disassembled, and therefore there is problem that cost for the maintenance rises up.

In this manner, assembling the gas turbine with applying such the press-fitting, shrinkage fitting and/or drawing, in particular, in the fitting structure of the shaft thereof, needs the facilities for the exclusive use of the press-fitting, shrinkage fitting and/or drawing, and also needs the facilities for the exclusive use when it is disassembled, as well as labor thereof.

Also, conventionally, no consideration was paid on assembling the gas turbine with meshing the concave-convex portions of teeth-type, in particular, in the shaft fitting structure thereof.

SUMMARY OF THE INVENTION

An object, according to the present invention, is to provide a gas turbine and a gas turbine power generator, being improved on applicability, in particular when assembling and disassembling thereof.

According to the present invention, for accomplishing the object mentioned above, first there is provided a gas turbine, comprising: a compressor rotor having a turbine rotor, a junction boss provided on the turbine rotor, and a tie rod provided on the junction boss, being combined in series by penetrated with the tie rod therethrough; a rotor shaft; and a generator core, wherein the compressor rotor and the junction boss are assembled, by fitting a first faucet joint provided on the compressor rotor and a first concave faucet joint provided on the junction boss in detachable manner, and the compressor rotor and the rotor shaft are assembled, in either one of conditions; fitting a second convex faucet joint provided on the compressor rotor and a second concave faucet joint provided on the rotor shaft in detachable manner, or fitting a second concave faucet joint provided on the compressor rotor and a second convex faucet joint provided on the rotor shaft in detachable manner.

Also, according to the present invention, for accomplishing the object mentioned above, there is provided a gas turbine, comprising: a compressor rotor having a turbine rotor, a junction boss provided on the turbine rotor, and a tie rod provided on the junction boss, being combined in series by penetrated with the tie rod therethrough; a rotor shaft; and a generator core, wherein the compressor rotor and the junction boss are assembled by fitting a first faucet joint provided on the compressor rotor and a first concave faucet joint provided on the junction boss in detachable manner, and further radial teeth are provided on both surfaces of the compressor rotor and the rotor shaft, opposing to each other, thereby combining the compressor rotor and the rotor shaft in releasable manner in a longitudinal direction of the tie rod, by meshing the teeth in rotating direction of the compressor rotor and the rotor shaft.

Further, according to the present invention, for accomplishing the object mentioned above, there is provided a gas turbine power generator, having any one of the gas turbines mentioned above, which further comprises: a combustor; a turbine for converting gas pressure produced in said combustor into rotating force of the turbine rotor; a compressor for supplying compressed air to the combustor by means of the compressor rotor, being rotated by receiving the rotating force of the turbine rotor; a generator core, being rotated by receiving the rotating force of the turbine rotor; a permanent magnet attached onto the generator core; and a generator coil disposed around an outer periphery of the generator core.

BRIEF DESCRIPTION OF THE SEVERAL VIEWS OF THE DRAWING

FIGS. 6(a) and 6(b) are enlarged cross-section views of a principle portion of other embodiment of the micro gas turbine power generator, according to the present invention; in particular, FIG. 6(a) shows the enlarged cross-section view of the principle portion, FIGS. 7(a)–7(c) are enlarged cross-section views of a principle portion of further other embodiment of the micro gas turbine power generator, according to the present invention; in particular, FIG. 7(a) shows the enlarged cross-section view of the principle portion.

DETAILED DESCRIPTION OF THE INVENTION

Figure 1:
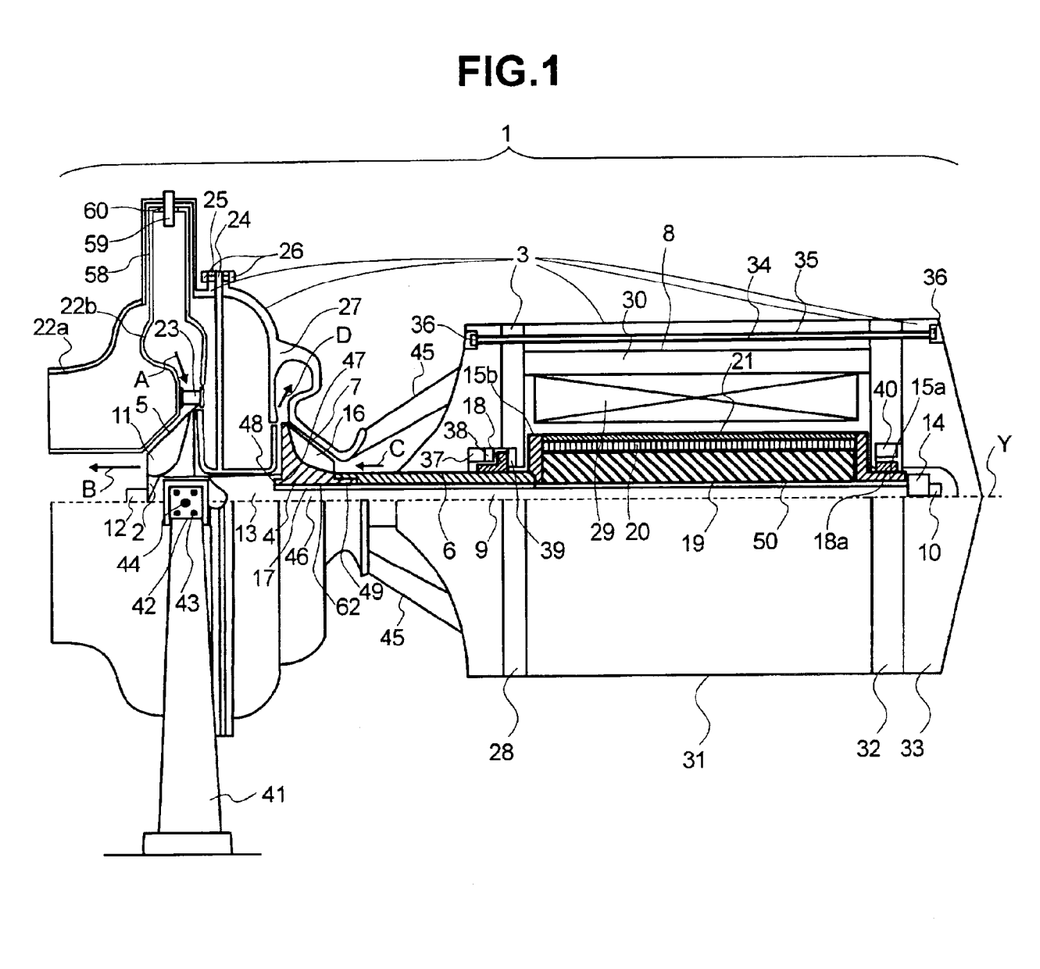
FIG. 1 shows a partial cress-section view of a micro gas turbine power generator, according to an embodiment of the present invention.

Hereinafter, explanation will be given on an embodiment and several variations thereof, according to the present invention, by referring to drawings attached herewith. FIG. 1 shows a vertical cross-section view of a micro gas turbine power generator, according to the present invention. The micro gas turbine generator 1 has a compressor 7, a combustor 58, a turbine 5, an electric power generator 8 and a casing 3 covering thereon.

The compressor 7 comprises a compressor rotor 4, a compressor-blade portion 16, and a compressor-generator casing 27 enclosing the compressor rotor 4 therein. The turbine 5 comprises a turbine rotor 2, a turbine blade-portion 11 formed on a turbine rotor 2, and a turbine inner casing 22b and a turbine outer casing 22a, which enclose the turbine rotor 2 therein. With the turbine rotor 2, there are provided a grab portion 12 for grabbing an end of turbine on one surface thereof, and a junction boss 13 formed on the opposite surface thereof. A central axis in rotation of the turbine-end grab portion 12 and the junction boss 13 is provided on a line elongated from the rotation axis of the turbine rotor 2. The turbine outer casing 22a and the compressor/generator casing 27 are joined by means of a fastening bolt 25 and a fastening nut 26, putting a spacer 24 between them.

The generator 8 has a cylinder-like generator core 19, being attached on a permanent magnet 20 therearound, a cylindrical cover for covering the outer periphery of the generator core 19, and a generator coil 29, which is provided within a generator coil outer casing 30 while keeping a gap from an outside of the cover 21, so as not to contact with the cover 21. The generator coil outer casing 30 is fixed onto the generator casing 31, and a front and a rear of the generator casing 31 are covered with a generator rear-end casing 28 and a generator front casing 32, respectively.

On the generator front casing 32 is equipped with a generator front-end casing 33, while the generator casing 31, the generator rear-end casing 28, the generator front casing 32 and the generator front-end casing 33 are joined by means of a bolt 34 penetrating through each of those casings and a nut 36. Those casings, which are joined with in this manner, are connected with in one body by means of struts 45 which are fixed onto the generator rear-end casing 28 and the compressor-generator casing 27.

At an end portion of the generator core 19 is fixed a plate-like rotor end structure 15b for covering over an end portion thereof, while at the other end portion of the generator core is a hollow rotor end structure 15a, which is covering over the end portion thereof and is also equipped with a bearing collar 18a to be received within a radial bearing 40.

Between the rotor end structure 15b and the compressor rotor 4, there is a hollow rotor shaft 6, and then the bearing collar 18 attached onto the rotor shaft 6 is enclosed by the radial bearing 37 attached onto the generator rear-end casing 28, a rear-side thrust bearing 38, and a front-side thrust bearing 39, in such a manner that it is received therein. The rotor end structure 15a is assembled, so that it can be supported by means of the radial bearing 40 attached onto the generator front casing 32 through the bearing collar 18a.

On the joint boss 13, which is connected with the turbine rotor 2, is also connected with an end of a tie bolt 9, so that the rotating center axis thereof is coincident with the rotating center axis of the turbine rotor 2 on a line elongated therefrom. At the other end of this tie bolt 9; i.e., the bolt end 10 shown in FIG. 2, a screw is formed, thereby to spirally connect with a nut 14.

Figure 2:
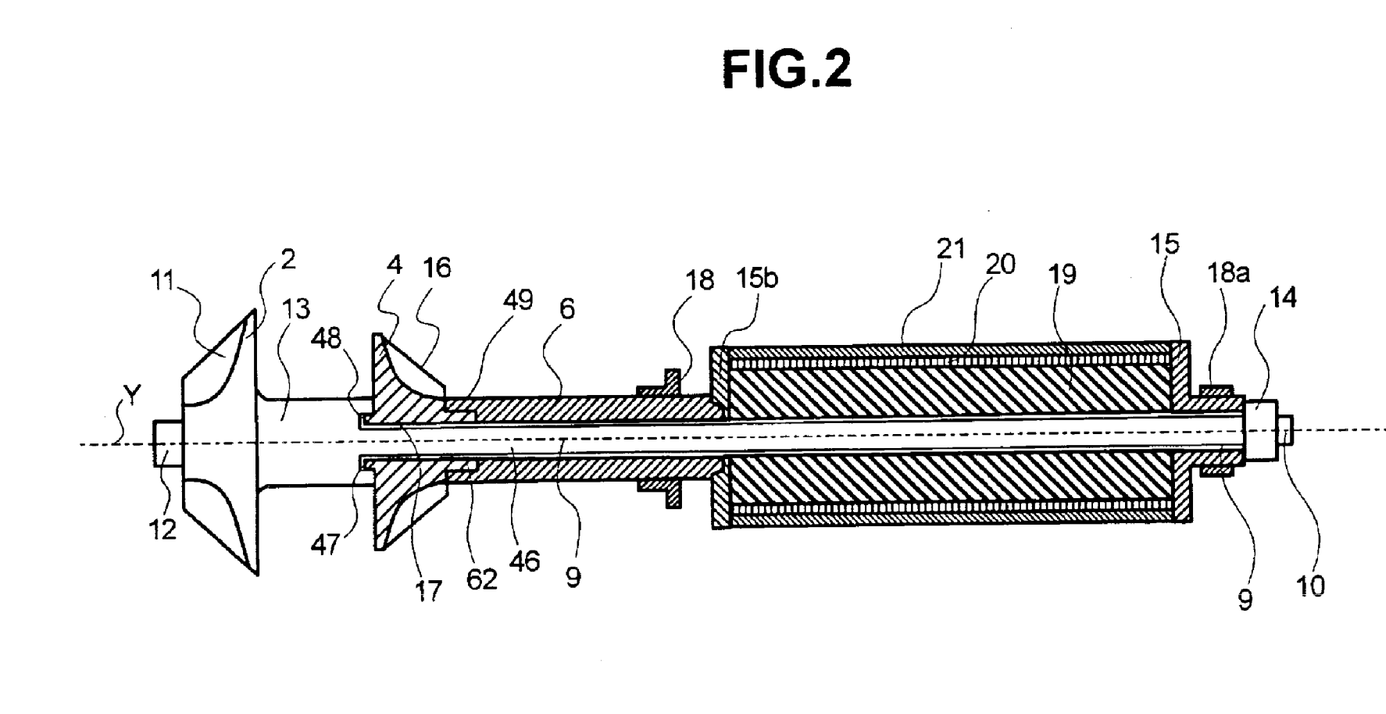
FIG. 2 shows a cross-section view of fitting structure of the gas turbine shaft, which is applied into the micro gas turbine power generator shown in FIG. 1.

This tie bolt 9 penetrates through a compressor center opening 17 opened at a center of the compressor rotor 4, an inside of the rotor shaft, a through hole 50 opened at the center of the generator core 19, and an inside of each of the rotor end structures 15a and 15b. At a screw portion of that tie bolt 9, the nut 14 is spirally connected with, and therefore the turbine rotor 2, the compressor rotor 4, the rotor shaft 6 and the generator core 19 can be assembled to be a series of axial fitting structures for the gas turbine, by squeezing up the tie bolt 9 through rotation of the nut 14, around the tie bolt 9 to be placed at the rotation center thereof.

Figure 3:
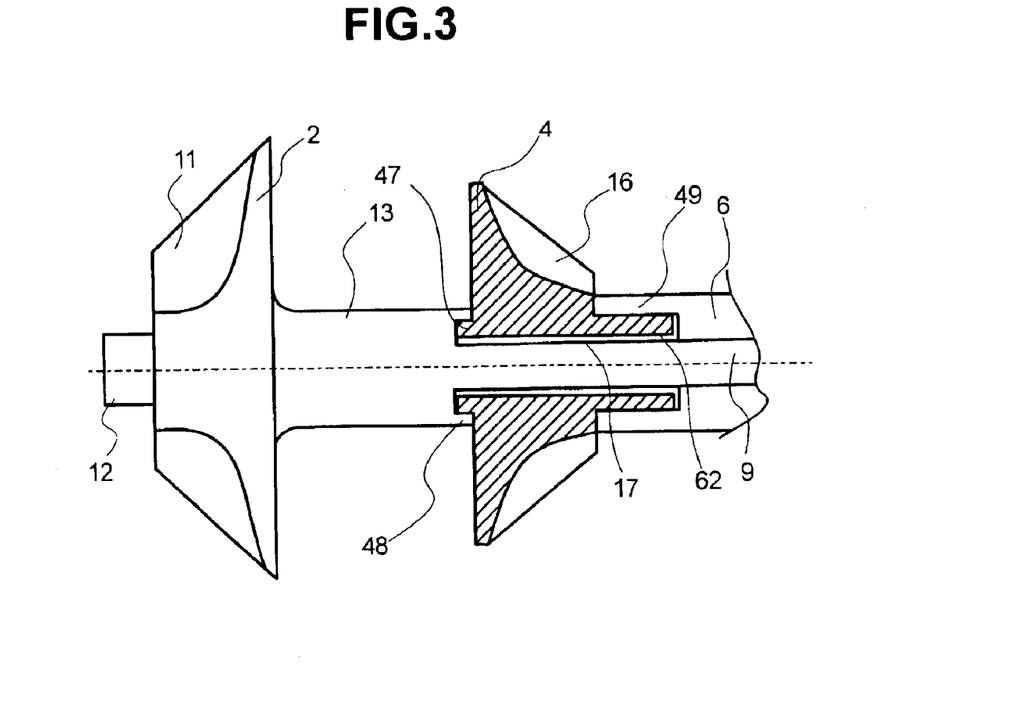
FIG. 3 shows an enlarged cross-section view of a principle portion of the structure shown in FIG. 2.

The assembling structures between the component parts of the axial fitting structures in the gas turbine are as shown in FIGS. 2 and 3. Namely, on an end surface of the joint boss 13 near to the compressor rotor 4, a ring-like groove is dig around a rotation center axis line Y of the turbine rotor 2, thereby forming a turbine shaft concave faucet joint 48.

On a surface of the compressor rotor 4 near to the joint boss 13, a ring-like projection is formed around the rotation center axis line Y of the turbine rotor 2, thereby to be a convex faucet joint 47. The convex faucet joint 47 is inserted into an inside of the concave faucet joint 48 without interferences therebetween. For this reason, the convex faucet joint 47 and the concave faucet joint 48 are in a tie-in relationship, under the condition that they can be freely inserted and pulled out (releasable) without the interferences. For this reason, the convex faucet joint 47 has a form of the ring-like groove around the rotation center axis line Y, into which the convex faucet joint 47 can be inserted. In this manner, the convex faucet joint 47 and the concave faucet joint 48 are in the shape of having a ring-like outlook, to be fitted with each other.

At a side of the compressor rotor 4 near to the rotor shaft 6, a ring is formed around the axis of rotation Y of the turbine rotor 2, as a convex faucet joint 62. At a side of the rotor shaft 6 near to the compressor rotor 4, a ring is formed abound the axis of rotation Y of the turbine rotor 2, as a concave faucet joint 49. It is also possible to form the concave faucet joint 49, by scraping out an inside of the rotor shaft 6.

The convex faucet joint 62 near to the rotor shaft 6 is inserted into the concave faucet joint 49 without the interferences therebetween. For this reason, the convex faucet joint 62 and the concave faucet joint 49 are in the tie-in relationship under the condition that they can be freely inserted and removed from the concave faucet joint 49 without the interferences.

An end portion of the rotor shaft 6 near to the generator core 19 is formed to be taper-like, being thinner at the tip thereof, while a taper-like concave fitting to that taper-like portion is formed on the rotor end structure 15a, thereby both the taper-like portions can be fitted to each other. When machining this taper surface, attention must be paid, so that the rotation center of the rotor shaft 6 and the generator core 19 does not come off the rotation center axis line Y of the turbine rotor 2 on this fitting.

As is shown in FIG. 3, the concave faucet joint 49 and the end surface of the concave faucet joint 48 are abutted onto the compressor rotor 4, however the end surface of each the convex faucet joint 47 on both sides of the compressor rotor 4 is not in contact with the joint boss 13 or the rotor shaft 6.

The combustor 58 is provided on the turbine inner casing 22b provided within an inside of the turbine outer casing 22a, and also within the combustor 58 are provided a burner 59 and a flow passage 60 for the combustor. On the turbine inner casing 22b is opened an opening for guiding combustion gas to a side of the turbine rotor 2, and at the opening portion is equipped with a turbine nozzle 23 for straitening the combustion gas.

A lower portion of a turbine support 41 shown in FIG. 1 is fixed onto a base. On an upper portion of the turbine support 41 is fixed a turbine support boss 42, and on the turbine support boss 42 is equipped with a center pin 44 and a plural number of anti-rotation pins thereround. The center pin 44 is fixed onto the turbine outer casing 22a, but is made freely rotatable with respect to the turbine support boss 42. Also, the anti-rotation pins are freely releasable from the through hole provided on the turbine support boss 42 and the pin holes provided on the turbine outer casing 22a, and thereby under the condition where the anti-rotation pins 43 are inserted into the through hole provided on the turbine support boss 42 and the pin holes provided on the turbine outer casing 22a, the micro gas turbine power generator 1 can be kept in such a position of being horizontal, as is shown in FIG. 1, or in a position of being perpendicular to that shown in FIG. 1; i.e., being different from by 90 degree. Also, in a case where the anti-rotation pins 43 are pulled out from the pin holes on the turbine outer casing 22a, the micro gas turbine power generator 1 is made freely rotatable in the upper/lower direction around the center pin.

In the present micro gas turbine power generator 1, the burner 59 ignites fuel, so as to burn it together with compressed air flowing from the combustor flow passage into the combustor 58, while passing combustion gas, which is generated through the combustion, in a direction of an arrow A within the gas turbine inner casing 22b, thereby letting the combustion gas to expand while hitting it on the turbine blade portion 11 after being straightened by the turbine nozzle 23, and thereafter the combustion gas flows out in a direction of an arrow B. The combustion gas flowing out in accordance with the arrow B is guided into a regenerative heat exchanger not shown in the figure.

Through hitting of the combustion gas onto the turbine blade portion 11, the rotor turbine 2 rotates, and at the same time, it rotates also the compressor rotor 4, the rotor shaft 6 and the generator core 19, etc. Rotation of the compressor rotor 4 sucks the air in an outside of the casing 3, as is shown by an arrow C, and the air is compressed by the compressor blade portion 16, thereby to be discharged as high-pressure compressed air, as is indicated by an arrow D.

The compressed air discharged in accordance with the arrow D is guided into the regenerative heat exchanger, to be pre-heated through heat exchange with the combustion gas flowing out in the direction of the arrow B within the regenerative heat exchanger, and thereafter it is guided from the flow passage for use of the combustor 58 into the combustor 58 to be an air for use of combustion. The combustion gas after the heat exchange is finally discharged into an outside of the micro gas turbine power generator 1. At an exit of the compressed air of the compressor/generator casing 27 may be provided a vane (not shown in the figure) for use of recovery of pressure.

On a while, since also the generator core 19 rotates together with the turbine rotor 2, alternative current is induced within the generator coil 29 due to that rotation. The current is converted into direct current by means of a rectifier not shown in the figure, and then it is converted into alternative current by means of an inverter not shown in the figure, thereby to be supplied to equipments using electricity.

In the present micro gas turbine power generator 1, the convex faucet joint 47 provided on the compressor rotor 4, receiving centrifugal forces of itself, as well as, the compressor rotor 4 and the compressor blade portion 16, is deformed in a diameter expanding direction; i.e., such the direction that the diameter thereof is expanded outwards, and therefore adhesion is enhanced or strengthened on the fitting surface between the convex faucet joint 47 and the concave faucet joint 48, or the convex faucet joint 62 and the concave faucet joint 49, thereby improving the adhesion properties. For the reason, without using the means, such as the press-fitting, baking shrinkage fitting or cooling shrinkage fitting, drawing, etc., which necessitate the interferences, it is possible to obtain a tightly fitting condition when the micro gas turbine power generator 1 is operated, as a matter of course, as if being fitted with the interferences therebetween, and the rotation center axis lines of neighboring rotating parts come to be coincident with each other.

Since each of the rotors 2 and 4 of this micro gas turbine power generator 1 rotates at a high speed, conventionally, the center deviation comes to be large on the rotating parts with respect to the rotation axis, and therefore, there is a fear that remaining unbalance on the each rotor comes to be large, so that the axial vibration comes to be large at a critical speed, however according to the present embodiment, there is no such the fear.

When operation of the micro gas turbine power generator 1 is stopped, the convex faucet joint 47 is turned from the diameter expanding condition back to an original condition; i.e., the condition where no interference lies on the fisting surface between the convex faucet joint 47 and the concave faucet joint 49 or the concave faucet joint 48. For the reason, when conducting the maintenance on the micro gas turbine power generator 1, it is possible to achieve disassembling of the turbine rotor 2, the compressor rotor 4 and the generator core 19, with ease, by rotating the nut 14 in the direction of releasing them from the squeezing condition by means of the tie bolt 9. Also when assembling the turbine rotor 2, the compressor rotor 4 and the generator core 19, since there is no interference in the fitting condition of each the faucet joint, each faucet joint can be simply inserted into, thereby obtaining the assembling each of the rotating parts, such as, the turbine rotor 2, the compressor rotor 4 and the generator core 19, with ease.

In case of assembling or disassembling the turbine rotor 2, the compressor rotor 4 and the generator core 19, it is conducted after changing the position of the tie bolt; i.e., from the condition where the tie bolt 9 lies horizontally, as shown in FIG. 1, such as when operating, into that where the tie bolt 9 lies vertically. Work of changing the position is to pull out the anti-rotation pins 43, in order to rise up the position of the tie bolt 9 in the vertical direction, so that the turbine rotor 2 comes down to a lower side through rotating operation thereof around the center pin.

Conducting the disassembling or assembling as was mentioned previously, after turning the position of the tie bolt 9 into the vertical direction, makes the work easy, comparing to the case where the disassembling or assembling is conducted by turning the tie bolt 9 into the horizontal direction, since each rotation center axis line of the parts to be assembled or disassembled is in coincident with the direction of gravity, as well as, the less in deformation of the each part.

In this manner, according to the present embodiment, which applies the structure shown in FIG. 3 therein, since no interference is provided at the fitting portion of the rotating parts, they can be easily assembled or disassembled, and thereby achieving reduction on costs, such as, a manufacturing cost, a periodical maintenance cost, and a repair const thereof, etc.

In the variation of the embodiment shown in FIG. 3, a cylindrical concave faucet joint is provided on the compressor rotor 4, while a cylindrical convex faucet joint is provided near to an inner periphery thereof by cutting an outer periphery of the rotor shaft 6. And, those convex faucet joint and the concave faucet joint are fitted to each other, but without provision of the interferences therebtween. In this case, the compressor rotor 4 and the rotor shaft 6 are assembled, adhering the right-hand side end surface of the concave faucet joint closely onto an end surface of the rotor shaft 6, while keeping a gap between the left-hand side end surface of the convex faucet join 52 and the compressor rotor, without contacting therewith. Other structures thereof are same to those shown in FIG. 3.

Also with this variation, in the same manner to the example shown in FIGS. 1 to 3, the enhancement or strengthening on the adhesion can be brought about upon the fitting surface between the compressor 4 and the junction boss 13, during the operation of the micro gas turbine power generator 1. In a case of considering that easiness in disassembling and assembling is important, but without having a large expectation on strengthening of the adhesion upon the fitting surface between the rotor shaft 6 and the compressor rotor 4, it is also possible to utilize such the variation.

With this variation, in a case where it is desired to strengthen the adhesion upon the fitting surface between the rotor shaft 6 and the compressor rotor 4, for the convex faucet joint at that fitting portion, it is possible to select such a material, that it can deform more easily in direction of enlarging the diameter than that deforming in the diameter of the concave faucet joint at that fitting portion, so as to made up the convex faucet joint of that material, thereby to fit it to the rotor shaft 6. Easiness in deformation may be the deformation caused depending on temperature, or may be easiness in deformation due to other force, such as, centrifugal force or the like, for example.

Figure 4:
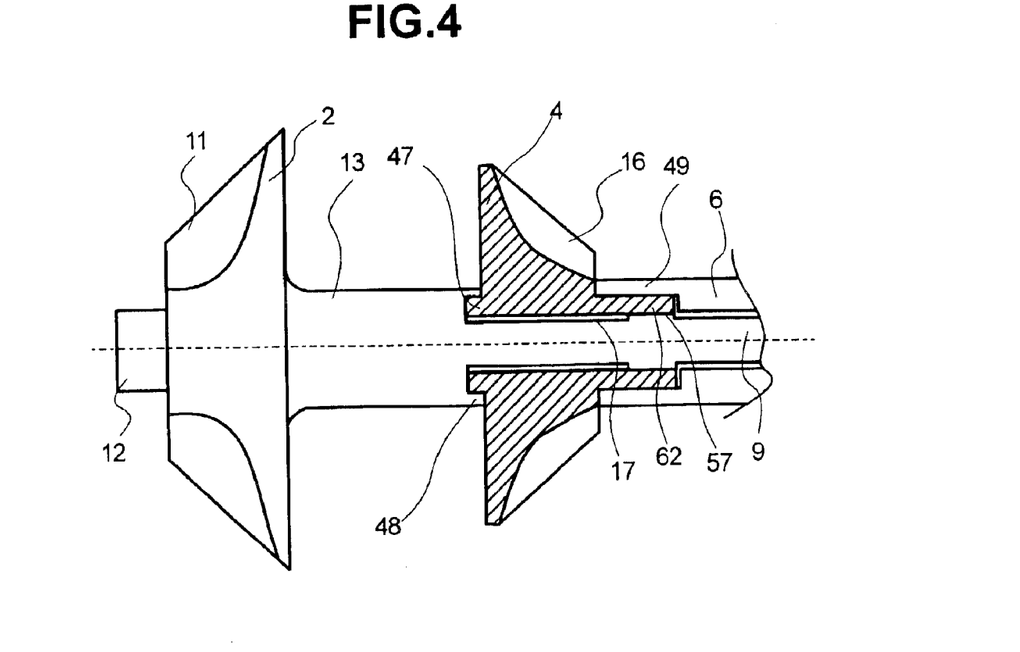
FIGS. 4 and 5 are enlarged cross-section views of a principle portion of the variation of the micro gas turbine power generator, according to the present invention.

FIG. 4 shows a variation of combination between the compressor rotor 4, the turbine rotor 2 and the rotor shaft 6. In the present variation, the compressor rotor 4 and the junction boss 13 are assembled, by fitting the convex faucet joint 47 provided on the inner periphery of the compressor rotor 4 and the concave faucet joint 48 provided on the junction boss 13, but without provision of the interferences therebetween. Also, the compressor rotor 4 and the rotor shaft 6 are assembled, by fitting the convex faucet joint 62 provided on the inner periphery of the compressor rotor 4 and the concave faucet joint 49 provided on the rotor shaft 6, but without the interferences.

The tie bolt 9 has an outer diameter portion 57 equal to the diameter of a center hole of the convex faucet joint 62, on an inner periphery of the faucet joint fitting part between the compressor rotor 4 and the rotor shaft 6, and it is assembled within a center hole of a faucet joint provided at the male side on the inner periphery of the compressor, but without the interferences therebetween. The outer diameter portion 57 is made larger in the diameter than the diameter of a portion of the tie bolt 9 in the vicinity of that diameter portion 57.

According to the present variation, since there is provided no interference at the fitting portion between the compressor rotor 4 and the rotor shaft 6 and the junction boss 13, nor between the outer diameter portion 57 and the center hole of the convex, faucet joint 62, therefore the assembling and disassembling thereof can be conducted easily, thereby obtaining reduction on the manufacturing cost and the costs for periodical maintenance and repair.

Since the tie bolt 9 comes up to high temperature due to thermal conduction from the turbine rotor 2 which becomes high temperature, too, especially, by receiving the combustion gas during the operation of the micro gas turbine power generator 1, then deformation occurs, so that the tie bolt 9 expands the outer diameter portion 57 thereof due to thermal expansion on the inner periphery of the convex faucet joint 62. And then, by means of the outer diameter portion 57 expanded in the diameter thereof, the convex faucet joint 62 is expanded in such the direction, that the diameter thereof extends while the outer periphery surface of the convex faucet joint 62 is pushed onto the inner periphery surface of the concave faucet joint 49, which is relatively low temperature since it lies in an outside nearer to an outside air than the tie bolt 9, thereby increasing the adhesion upon the fitting surface where both the faucet joints are in contact with.

When adhesion is strengthened upon the fitting surface, it results in the adhesion upon the fitting surface more closely between the both faucet joints, and thereby protecting the rotating parts, such as the rotor shaft 6, the compressor rotor 4 and the turbine rotor 2, etc., from deviation of the core between them.

In a further variation of the embodiment shown in FIG. 4, the compressor rotor 4 and the junction boss 13 are assembled, by fitting the convex faucet joint 47 provided on the inner periphery of the compressor rotor 4 and the concave faucet joint 48 provided on the junction boss 13, but without provision of the interferences therebetween. The compressor rotor 4 and the rotor shaft 6 are assembled, by fitting the cylinder-like concave faucet joint provided on the compressor rotor 4 and the cylinder-like convex faucet joint provided on the rotor shaft 6, but without provision of the interferences therebetween.

The tie bolt 9 has an outer diameter portion 57 equal to the diameter of a center hole of the convex faucet joint, on an inner periphery of the faucet joint fitting part between the compressor rotor 4 and the rotor shaft 6, and it is assembled within a center hole of the convex faucet joint, but without the interferences therebetween. The outer diameter portion 57 is made to be larger in the diameter than the diameter of a portion of the tie bolt 9 in the vicinity of that diameter portion 57. Other structures thereof are same to those shown in FIG. 4.

According to this variation, since there is provided no interference between the compressor rotor 4 and the rotor shaft 6 and the junction boss 13, nor between the outer diameter portion 57 and the center hole of the convex faucet joint, therefore the assembling and disassembling thereof can be conducted easily, thereby obtaining reduction on the manufacturing cost and the costs for periodical maintenance and repair.

Also, since the tie bolt 9 comes up to high temperature due to thermal conduction from the turbine rotor 2 which becomes high temperature, too, especially, by receiving the combustion gas during the operation of the micro gas turbine power generator 1, then deformation occurs, so that the tie bolt 9 expands the outer diameter portion 57 thereof, due to thermal expansion on the inner periphery of the convex faucet joint at the fitting portion between the compressor rotor 4 and the rotor shaft 6. For the reason, due to deformation of the outer diameter portion 57, the diameter of the convex faucet joint at the faucet joint fitting portion between the compressor rotor 4 and the rotor shaft 6 is expanded in such the direction that the diameter thereof extends while the outer periphery surface of the convex faucet joint is pushed onto the inner periphery surface of the concave faucet joint, which is relatively low temperature since it lies in an outside nearer to an outside air than the tie bolt 9, thereby enhancing or strengthening the adhesion upon the fitting surface where both the faucet joints are in contact with.

In this manner, if adhesion is strengthened upon the fitting surface, it brings the fitting surface to adhere closely, thereby preventing the rotating parts, such as the rotor shaft 6, the compressor rotor 4 and the turbine rotor 2, etc., from deviating the core thereof between them.

Figure 5:
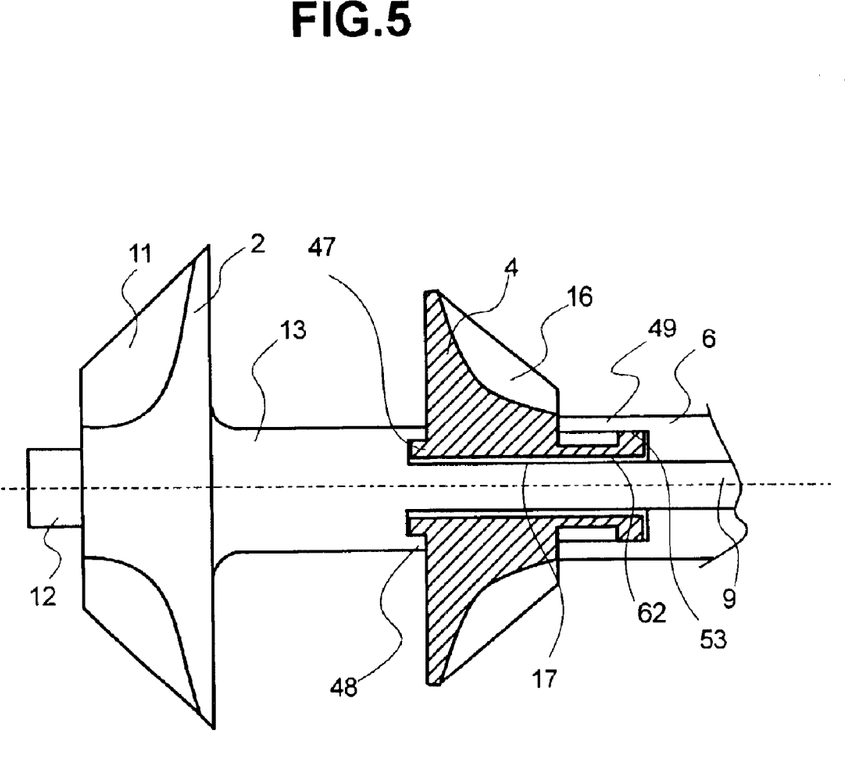

FIG. 5 shows other varition of combination between the compressor rotor 4, the turbine rotor 2 and the rotor shaft 6. In the present variation, the compressor rotor 4 and the junction boss 13 are assembled, by fitting the convex faucet joint 47 provided on the inner periphery of the compressor rotor 4 and the concave faucet joint 48 provided on the junction boss 13, but without provision of the interferences therebetween. Also, the compressor rotor 4 and the rotor shaft 6 are assembled, by fitting the convex faucet joint 62 provided on the inner periphery of the compressor rotor 4 and the concave faucet joint 49 provided on the rotor shaft 6, but without the interferences therebetween.

Except for a right-hand side tip portion of the convex faucet joint 62; i.e., a convex faucet joint shaft head 53, an outer periphery of the convex faucet joint 62 is machined to be thinner than the thickness of the convex faucet joint shaft head 53. For the reason, the machined portion will not contact with the concave faucet joint 49, but a portion of the convex faucet joint shaft head 53 is in contact with the concave faucet joint 49, but without the interferences therebetween.

According to the present variation, since there is provided no interference at the fitting portion between the compressor rotor 4, the rotor shaft 6 and the junction boss 6, therefore the assembling and disassembling thereof can be conducted easily, thereby obtaining reduction on the manufacturing cost, as well as the costs for periodical maintenance and repair.

Since a middle portion of the convex faucet joint 62 is scraped, so as to increase the deformation of the convex faucet joint 62 in the radial direction thereof, then the convex faucet joint 62, receiving centrifugal force thereon, can easily cause the deformation in the radial direction, and thereby the convex faucet joint shaft head 53 adheres upon an inner periphery of the concave faucet joint 41 more closely. In this manner, if the fitting surface between the both faucet joints, i.e., the convex faucet joint 62 and the concave faucet joint 49, is adhered with strengthening the adhesion therebetween, it is possible to prevent the rotating parts, such as the rotor shaft 6, the compressor rotor 4 and the turbine rotor 2, etc., from deviating on the core thereof between them.

As a variation of that shown in FIG. 5, the compressor rotor 4 and the junction boss 13 may be assembled, by fitting the convex faucet joint 47 provided on the inner periphery of the compressor rotor 4 and the concave faucet joint 48 provided on the junction boss 13, but without provision of the interferences therebetween. In this case, the compressor rotor 4 and the rotor shaft 6 are assembled, by fitting the convex faucet joint provided on the rotor shaft 6 into the cylinder-like concave faucet joint provided on the compressor rotor 4 near the rotor shaft 6, but without provision of the interferences therebetween.

Except for a left-hand side tip portion of the convex faucet joint provided on the rotor shaft 6, i.e., a convex faucet joint shaft head, an outer periphery of the convex faucet joint is machined to be thinner than the thickness of the convex faucet joint shaft head. For that reason, the machined portion will not contact with the inner periphery of the concave faucet joint provided on the compressor rotor 4 near to the rotor shaft 6, but a convex faucet joint shaft head 54 is in contact with the concave faucet joint without the interferences therebetween. Other structures thereof are same to those shown in FIG. 5.

According to the present variation, since there is provided no interference between the compressor rotor 4, the rotor shaft 6 and the junction boss 13, therefore the assembling and disassembling thereof can be conducted easily, thereby obtaining reduction on the manufacturing cost, as well as the costs for periodical maintenance and repair.

Also, centrifugal force, which is applied on a convex faucet joint 52 due to operation of the micro gas turbine power generator 1, functions to increase deformation in the direction of expanding the diameter of that convex faucet joint outward, since the convex faucet joint provided on the rotor shaft 6 is scraped in the middle portion thereof, and therefore the convex faucet joint shaft head portion adheres onto the inner peripheral surface of the concave faucet joint, which is provided on the compressor rotor 4 near to the rotor shaft 6. In this manner, the adhesion is enhanced or strengthened upon the fitting surface of both; i.e., the concave faucet joint and the convex faucet joint, which are provided at the fitting portion between the compressor rotor 4 and the rotor shaft 6, so as to increase the degree of adhesion, and thereby it is possible to prevent the rotating parts, such as the rotor shaft 6, the compressor rotor 4 and the turbine rotor 2, etc., from deviating the core thereof between them.

Figure 6A:
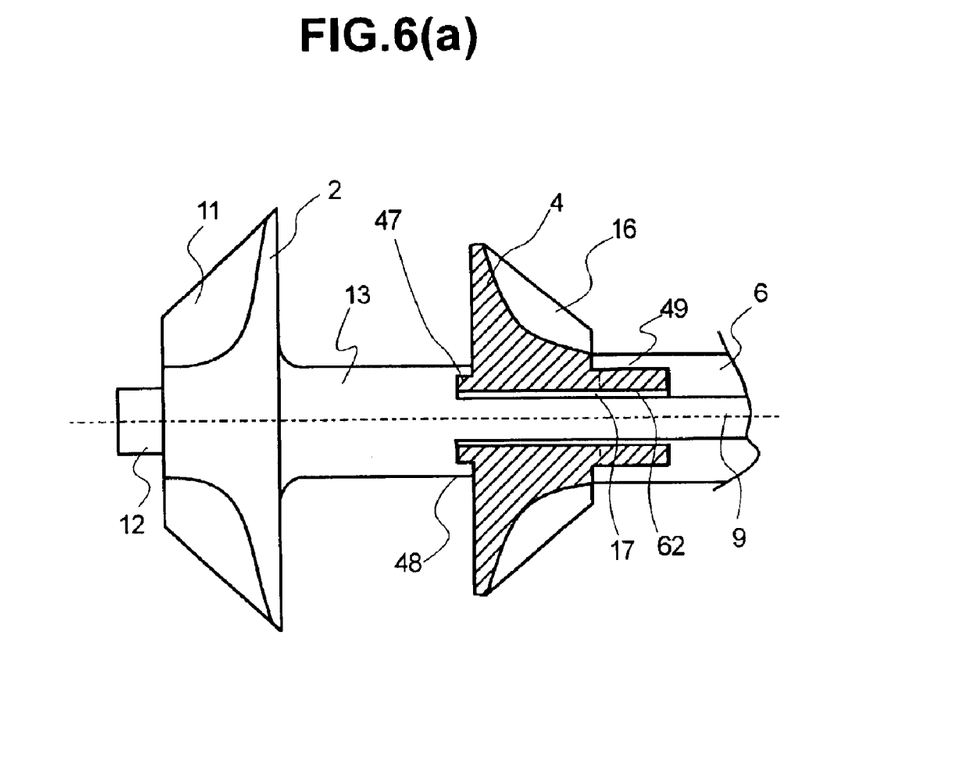
Figure 6B:
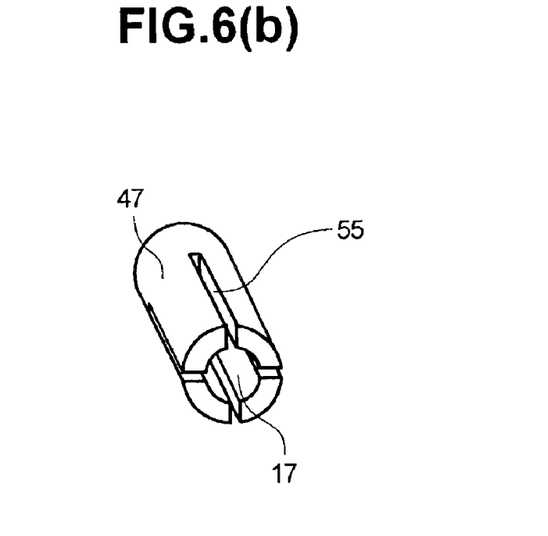
FIG. 6(b) shows a perspective view of a convex faucet joint shown in FIG. 6(a)

FIGS. 6(a) and 6(b) show further other variation of combination between the compressor rotor 4, the turbine rotor 2 and the rotor shaft 6. In the example shown in FIG. 6, the compressor rotor 4 and the junction boss 13 are assembled, by fitting the convex faucet joint 47 provided on the inner periphery of the compressor rotor 4 and the concave faucet joint 48 provided on the junction boss 13, but without provision of the interferences therebetween. The compressor rotor 4 and the rotor shaft 6 are assembled, by fitting the convex faucet joint 62 provided on the compressor rotor 4 and the cylinder-like concave faucet joint 49 provided on the rotor shaft 6, but without provision of the interferences therebetween.

On the convex faucet joint 62, as is shown in FIG. 6(b), four (4) pieces of slits are provided on the periphery thereof, being separated by 90°, and thereby a right-hand side tip portion of the convex faucet joint 62 is divided into four (4) by those slits 55. Accordingly, the slits 55 are formed in the cylindrical faucet joint, on the convex faucet joint. As is shown in FIG. 6(a), under the condition where the concave faucet joint 49 and the convex faucet joint are fitting, the right-hand side end surface of the convex faucet joint 62 is not in contact with the rotor shaft 6; i.e., there is nothing to abut thereon, therefore the right-hand side end surface can be easily deviated from.

According to the present variation, there is provided no interference at the fitting portions between the compressor rotor 4, the rotor shaft 6 and the junction boss 13, therefore the assembling and disassembling thereof can be conducted easily, thereby obtaining reduction on the manufacturing cost, as well as the costs for periodical maintenance and repair.

Also, because of provision of the slits 55 on the convex faucet joint 62, the centrifugal force brought on the convex faucet joint 62 due to the operation of the micro gas turbine power generator 1 functions to increase deformation in the radial direction, so that the diameter of the convex faucet joint 62 expands outward, and therefore the outer periphery surface of the convex faucet joint 62 adheres onto the inner periphery surface of the concave faucet joint 49, much stronger than before the micro gas turbine power generator 1 starts operation. In this manner, with adhering the convex faucet joint 62 and the concave faucet joint 49 strongly, it is possible to prevent the rotating parts, such as the rotor shaft 6, the compressor rotor 4 and the turbine rotor 2, etc., from the core deviation between them.

As a variation of the structure shown in FIGS. 6(*a*) and 6(*b*), it is possible to propose other example of combination between the compressor rotor 4, the turbine rotor 2 and the rotor shaft 6. In that example, the compressor rotor 4 and the junction boss 13 are assembled by fitting the convex faucet joint 47 provided on the inner periphery of the compressor rotor 4 and the concave faucet joint 48 provided on the junction boss 13, but without provision of the interferences therebetween. Also, the compressor rotor 4 and the rotor shaft 6 are fitted to, between the cylindrical concave faucet joint 51 provided on the compressor rotor 4 near to the rotor shaft 6 and the convex faucet joint provided on the rotor shaft 6, but without provision of the interferences therebetween.

In the convex faucet joint provided on the rotor shaft 6, in the same manner to that shown in FIG. 6(*b*), the cylindrical convex faucet joint is provided with four (4) pieces of slits 55, separating from at every 90° distance on the periphery thereof, and the left-hand side tip portion of the convex faucet joint is divided into four (4) by those slits. The left-hand side end surface of the convex faucet joint is not in contact with the compressor rotor 4, and therefore it can be easily deviated from. Other structures thereof are same to those of the example shown in FIGS. 6(*a*) and 6(*b*).

According to the present variation, since there is provided no interference at the fitting portion between the compressor rotor 4, the rotor shaft 6 and the junction boss 13, therefore the assembling and disassembling thereof can be conducted easily, thereby obtaining reduction on the manufacturing cost, as well as, on the costs for periodical maintenance and repair.

Also, due to provision of the slits 55 on the convex faucet joint, the centrifugal force, which is applied on the convex faucet joint provided on the rotor shaft 6 due to the operation of the micro turbine power generator 1, functions to increase deformation in the radial direction so that the diameter of the convex faucet joint expands outward, and thereby adhering the outer periphery surface of the convex faucet joint onto the inner periphery surface of the concave faucet joint to be fit with the convex faucet joint, much stronger than when the micro gas turbine power generator 1 starts the operation thereof. In this manner, each fitting surface of the faucet joints adheres closely, which are used for fitting between the compressor rotor and the rotor shaft, due to the centrifugal force, thereby it is possible to prevernt the rotating parts, such as the rotor shaft 6, the compressor rotor 4 and the turbine rotor 2, etc., from deviating the core thereof between them.

Figure 7A:
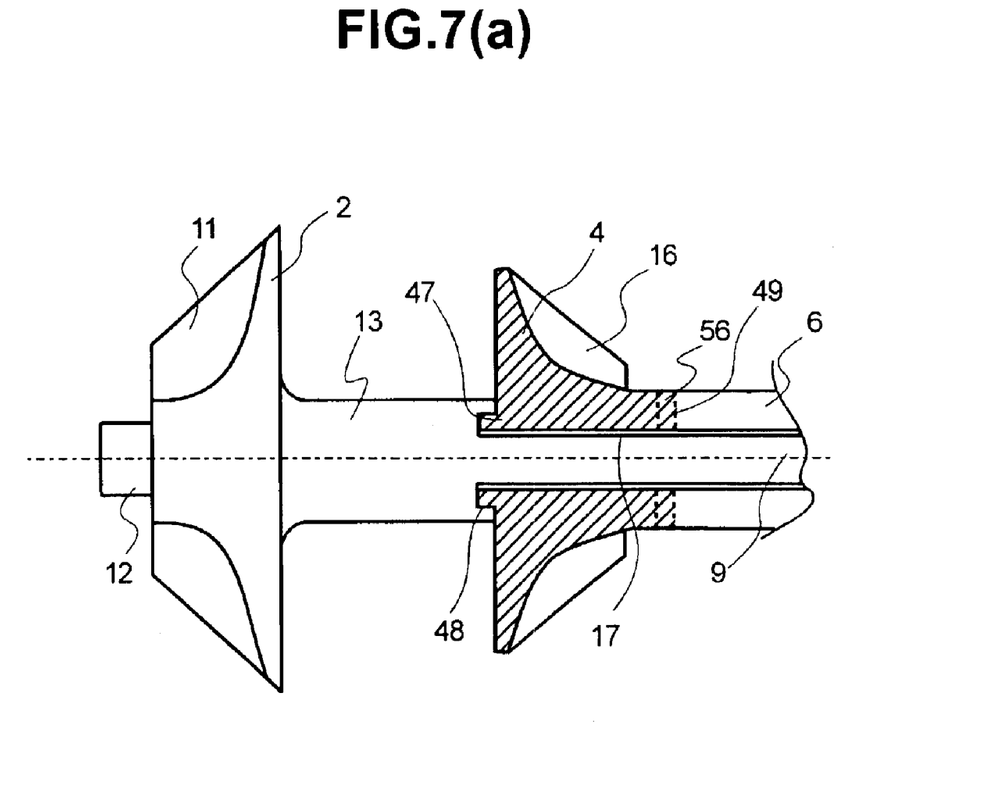
Figure 7B:
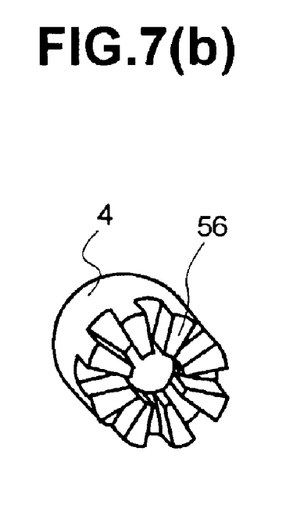
FIGS. 7(b) and 7(c) are perspective views of the same.
Figure 7C:
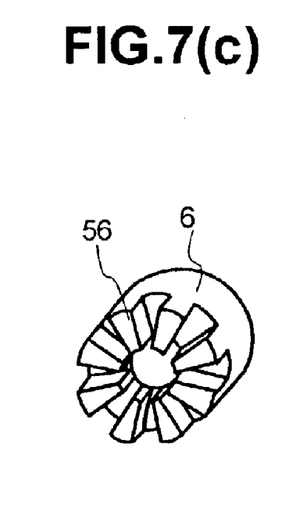

FIGS. 7(*a*) to 7(*c*) show further other variation of combination between the compressor rotor 4, the turbine rotor 2 and the rotor shaft 6. In the present variation, the compressor rotor 4 and the junction boss 13 are assembled, by fitting the cylindrical convex faucet joint 47 provided on the inner periphery of the compressor rotor 4 and the cylindrical concave faucet joint 48 provided on the junction boss 13, but without the interferences therebetween.

Also, on end surfaces of the compressor rotor 4 and the rotor shaft 6, opposing to each other, as shown in FIGS. 7(*b*) and 7(*c*), radial teeth 56 are formed in a plural number thereof. In this manner, on the end surfaces of the compressor rotor 4 and the rotor shaft 6, opposing to each other is formed concave-convex by means of the radial teeth 56.

The compressor rotor 4 and the rotor shaft 6 are assembled, by meshing the respective radial teeth 56 thereof with each other. When meshing the respective radial teeth 56 with each other, they are made releasable in a longitudinal direction of the tie rod, without the interferences between the teeth. With such the combination, rotating force can be transmitted between the rotor shaft 6 and the compressor rotor 4, with suppressing slip therebetween.

According to the present variation, since there is provided no interference at the meshing portion between the compressor rotor 4 and the rotor shaft 6 and the fitting portions between the compressor rotor 4 and the junction boss 13, therefore the assembling and disassembling thereof can be conducted easily, thereby reducing the manufacturing cost, as well as, the costs for periodical maintenance and repair.

Also, since the compressor rotor 4 and the rotor shaft 6 are assembled through the radial teeth 56 at the abutting surface thereof, they will not restrain with each other by displacement in the radial direction due to the thermal expansion thereof, thereby it is possible to prevent the rotary parts from the core deviation thereof. Further, it is also possible to transmit the rotating torque through the teeth, with certainty.

Figure 8:
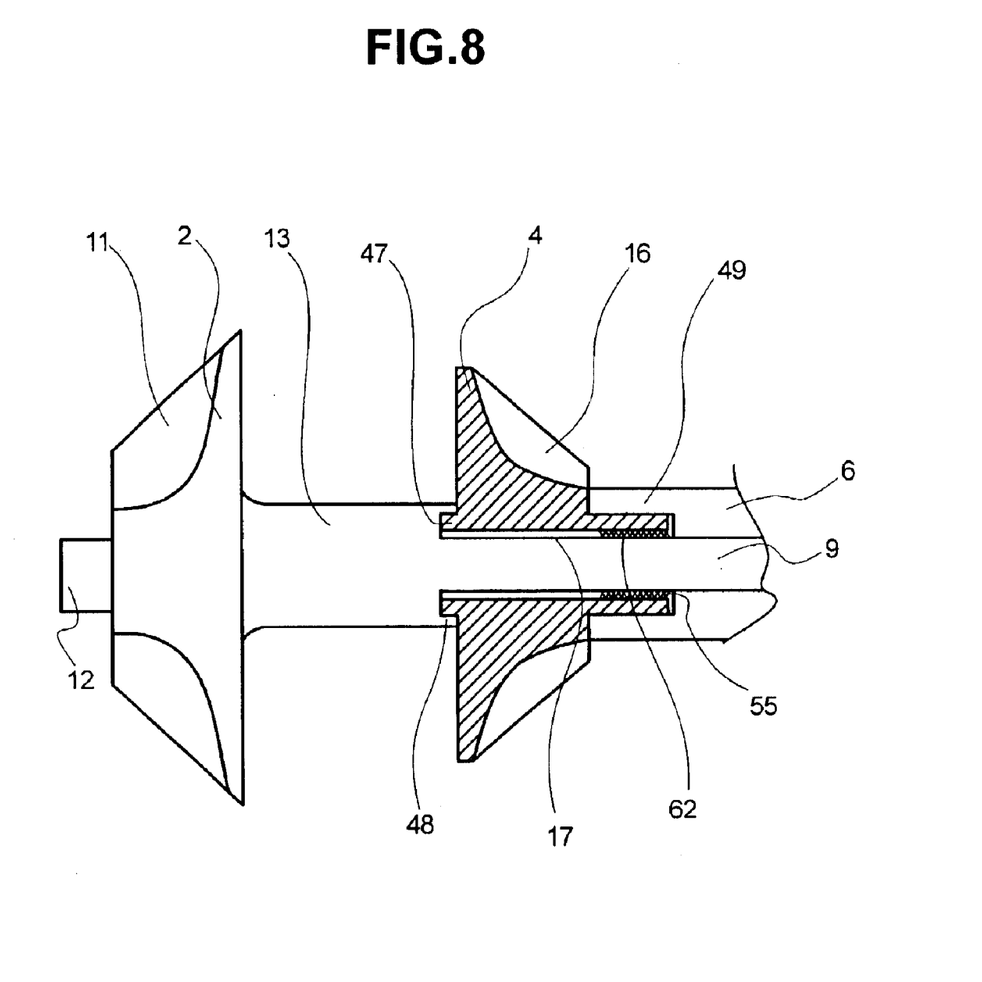
FIGS. 8 and 9 are enlarged views of further other variations of the micro gas turbine power generator, according to the present invention.
Figure 9:
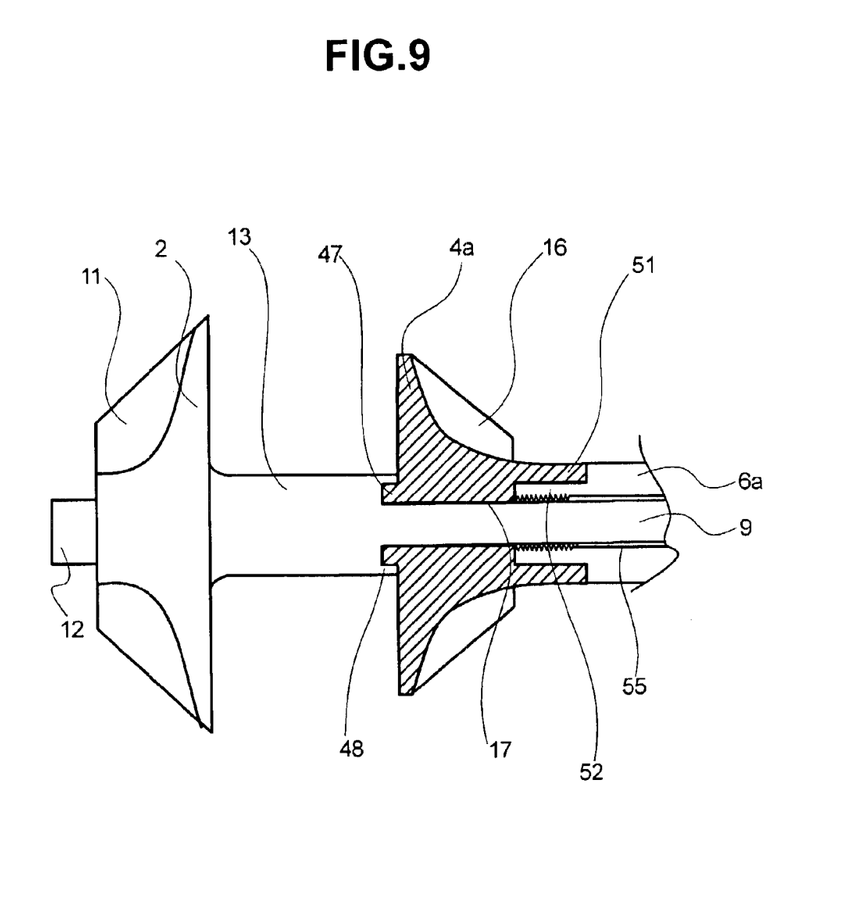

FIGS. 8 and 9 show further other variations of the micro gas turbine power generator, according to the present invention. FIG. 8 shows a case where the faucet joint of the compressor rotor on front side thereof is the convex faucet join, and FIG. 9 a case where it is the concave faucet joint. According to the present variation, female screw 55 is formed on an inner peripheral surface of a member, on which the convex faucet joint is formed. The member formed with the female screw 55 thereon is the compressor rotor 4*a* in FIG. 8 and is the rotor shaft 6*a* in FIG. 9, respectively. The female screw 55 is used when they are disassembled. In both variations, the convex faucet joint 47 formed on a rear side surface of the compressor rotor 4 or 4*a* and the concave faucet joint 48 formed on the junction boss 13 are idly fitted. On the other hand, the faucet joint 51 or 62 on the front side surface of the compressor rotor 4 or 4*a* is closely or tightly fitted with the faucet joint 49 or 52 of the rotor shaft 6 or 6*a*. With this, it is possible to disassemble the turbine portion and the compressor portion, easily.

As was fully mentioned in the above, according to the present invention, since there no interference is provided in a part or all of the fitting parts of the rotary structure portions in the gas turbine, it is easy to assemble the rotary structure portions, thereby obtaining reduction on the manufacturing cost, as well as, on the costs for periodical maintenance and repair. Furthermore, in those where adhesion can be increased at the fitting portion between each faucet joint during operation of the gas turbine power generator, or where the radial teeth are used therein, rotating torque can be transmitted, with certainty, between the rotary parts which are assembled through the fitting portions and/or the teeth, while suppressing slippage therebetween. Furthermore, it is possible to reduce an amount of unbalance remaining at the rotary structure portions when manufacturing the gas turbine.

What is claimed is:

1. A gas turbine, comprising:
   a turbine rotor having a turbine blade portion, a junction boss which is connected to said turbine blade portion and is formed with a first concave faucet joint thereon, and a tie rod connected to said junction boss;
   a compressor rotor, on which a first and a second convex faucet joint are formed;
   a rotor shaft, on which a second concave faucet joint is formed; and
   a generator core, wherein said compressor rotor and said rotor shaft and said generator core are attached sequentially to said tie rod in an order thereof, whereby assembling said compressor rotor and said junction boss by fitting said convex faucet joint and said first concave faucet joint in detachable manner, and said compressor rotor and said rotor shaft by fitting said second convex faucet joint and said second concave faucet joint in detachable manner.

2. A gas turbine, as claimed in claim 1, wherein an outer diameter of a portion of said tie rod where said second convex faucet joint is inserted is larger than a diameter of other portion thereof neighboring to that portion in an axial direction thereof.

3. A gas turbine, as claimed in claim 1, wherein an outer diameter of said second convex faucet joint at a tip portion is larger than that on a middle portion in an axial direction thereof, and the middle portion is in condition of non-contact with said second concave faucet joint.

4. A gas turbine, as claimed in claim 1, wherein said second convex faucet joint is divided by means of slits an a periphery thereof, at least at a tip portion thereof.

5. A gas turbine, as claimed in claim 1, wherein said compressor rotor and said junction boss are assembled by fitting said first convex faucet joint and said first concave faucet joint idly, while said compressor rotor and said rotor shaft are assembled by fitting said second convex faucet joint and said second concave faucet joint tightly.

6. A gas turbine, as claimed in claim 5, wherein a female screw is formed on an inner periphery surface of said second convex faucet joint.

7. A gas turbine, comprising:
   a turbine rotor having a turbine blade portion, a junction boss which is connected to said turbine blade portion and is formed with a first concave faucet joint thereon, and a tie rod connected to said junction boss;
   a compressor rotor, on which a first and a second convex faucet joint are formed;
   a rotor shaft, on which a second concave faucet joint is formed;
   a generator core;
   a permanent magnet attached onto said generator core;
   a generator coil disposed on an outer periphery thereof, opposing said generator core; and
   a combustor, wherein said compressor rotor and said rotor shaft and said generator core are attached sequentially to said tie rod in an order thereof, whereby assembling said compressor rotor and said junction boss by fitting said convex faucet joint and said first concave faucet joint in detachable manner, and said compressor rotor and said rotor shaft by fitting said second convex faucet joint and said second concave faucet joint in detachable manner.

* * * * *